United States Patent [19]

Mann et al.

[11] Patent Number: 4,530,326
[45] Date of Patent: Jul. 23, 1985

[54] DEVICE FOR TRANSMITTING THE SET POINT OF A SET POINT ADJUSTER

[75] Inventors: Arnold Mann, Bieber; Gerhard Ruschek, Hattersheim; Reinhard Zenker, Frankfurt, all of Fed. Rep. of Germany

[73] Assignee: VDO Adolf Schindling AG, Frankfurt am Main, Fed. Rep. of Germany

[21] Appl. No.: 581,858

[22] Filed: Feb. 21, 1984

[30] Foreign Application Priority Data

Mar. 7, 1983 [DE] Fed. Rep. of Germany ....... 3307968

[51] Int. Cl.³ .............................................. F02D 11/04
[52] U.S. Cl. .................................... 123/342; 123/361; 123/400
[58] Field of Search ............... 123/342, 361, 376, 396, 123/399–401, 198 D

[56] References Cited

U.S. PATENT DOCUMENTS 3,901,207 8/1975 Remaud ......................... 123/198 D
4,270,501 6/1981 Breen et al. ........................ 123/396

FOREIGN PATENT DOCUMENTS 2451286 11/1980 France ............................... 123/361

Primary Examiner—William A. Cuchlinski, Jr.
Attorney, Agent, or Firm—Martin A. Farber

[57] ABSTRACT

A device for the transmission by electrical transmission means 2 of the set-point between an idling position and a full-gas position of an electrical set-point adjuster 1 which is displaceable by the driver of a vehicle by means of a regulating unit, and controls the speed of travel of the vehicle by a control element 4 which is displaceable in corresponding manner between an idling position and a full-gas position. The control element is coupled to a control member 6 which controls the fuel-air mixture of an internal-combustion engine. Between the set-point adjuster 1 and the control element 4 there is arranged a mechanical transmission element 7 which can be coupled with the set-point adjuster 1 and the control element 4 and by which the position of the set-point adjuster 1 can be transmitted to the control element 6.

9 Claims, 3 Drawing Figures

20

DEVICE FOR TRANSMITTING THE SET POINT OF A SET POINT ADJUSTER

BACKGROUND OF THE INVENTION

The present invention concerns a device for the transmission by electrical transmission means of the set point between an idling position and a full-gas position of an electrical set-point adjuster which is displaceable by the driver of a vehicle by means of a regulating unit and controls the speed of travel of the vehicle by a control element, such as an electromechanical actuator, which is displaceable in corresponding manner between an idling position and a full-gas position, and is coupled to a control member, such as a throttle valve, which controls the fuel-air mixture of an internal combustion engine.

In such known devices, the transmission of the position of the gas pedal to the throttle valve of a carburetor or to the regulating rod of an injection pump is effected electrically. In this connection a set-point adjuster which produces an electric signal for the proper control of the control element is displaced by the gas pedal. Said control element then carries out an adjustment movement which is transferred to a control member constituting the throttle valve or the control rod of the injection pump.

These known devices, to be sure, operate in themselves reliably. Nevertheless, disturbances which occur by way of exception are conceivable in which the position of the set point adjuster is not transmitted correctly to the control element and the control member. In that case the vehicle can become incapable of maneuvering if the control member is no longer actuatable. Such a situation is dangerous since the vehicle, on the one hand, can suddenly become incapable of maneuvering at a time which is unfavorable for traffic and, on the other hand, can remain standing at dangerous, for instance concealed, places on the road.

It is therefore the object of the invention to create a device in accordance with the foregoing description which assures maneuverability of the vehicle.

SUMMARY OF THE INVENTION

According to the invention, between the set-point adjuster (1) and the control element (4) or the control member (6) there is a mechanical transmission element (7, 7') which can be coupled to the set-point adjuster (1) and the control element (4) and control member (6), and by which the position of the set-point adjuster (1) can be transmitted to the control member (6). Upon the normal correct operation of the device, a transmission of movement is effected only by the electric controlling of the control element while the transmission element remains free of force and passive. However, if a defect occurs in the electrical signal transmission, the set-point adjuster or the control element then the transmission of movement is effected mechanically by the transmission element. The vehicle can thus be driven out of the flow of traffic to the next repair station without stopping.

If the transmission element (7,7') is disconnected from the set-point adjuster (1) and/or the control element (4) and/or the control member (6) in the position of the control member (6) which corresponds to the position of the set-point adjuster (1), then there is practically no disturbing influence from the passive transmission element when the device is intact.

The transmission element (7) can be a rod (11, 12). However, if the transmission element (7') is a Bowden cable (18), then it can be placed in the vehicle in simple manner.

In order, in the event of a defect, to avoid racing of the engine and the erroneous reactions of the driver possibly caused thereby, the control element (4) and/or the control member (6) can be urged by spring action into its idling position so that, in the idling position of the gas pedal, the control member is also in the idling position.

The transmission element (7, 7') can be arranged, movable by a certain play (9) freely in direction of displacement on the set-point adjuster (1) and/or the control element (4) and/or the control member (6), said play being less than the maximum adjustment path. This play (9) preferably amounts to 30% of the maximum displacement path of the set-point adjuster (1) or control element (4) or control member (6). As a result, when the device is intact the control element and the control member can move unimpeded into a position closer to the idling position than the position of the control member corresponding to the instantaneous position of the set-point adjuster. This must be possible when the control element is electrically controllable not only as a function of the position of the set-point adjuster but in addition also in accordance with other additional functions. One such additional function is, for instance, a final speed-of-revolution limitation or a speed limitation or regulation. For this purpose, the control element is not controlled directly by the set-point adjuster but rather via an electronic regulator connected in front of it. Play on the order of magnitude of 30% of the maximum displacement path is sufficient to avoid coupling of the transmission element and at the same time to make possible a movement of the control member of up to 70% of the maximum displacement path in the event of a defect.

In one simple embodiment of the invention, the transmission element (7, 7') may have a stop (17) which, after the overcoming of the play (9), can be coupled in form-locked manner with a displacement member of the set-point adjuster (1) or of the control element (4) or the control member (6).

If the transmission element (7, 7') has a compensating element (8, 8') via which the part of the transmission element (7, 7') which can be connected with the set-point adjuster (1) can be moved simultaneously against spring force towards the full-gas position, and the part of the transmission element (7, 7') which can be connected with the control element (4) or the control member (6) can be moved towards the idling position, then in the event of a defect on the part of the set-point adjuster but with the electronic regulator still in operation, the control element can move in the direction towards the idling position even though the transmission element has already produced a form-locked coupling between the gas pedal, which forms the regulating member and the control element or control member.

In order to produce the spring force which acts on the transmission element (7, 7'), the compensating element (8, 8') may be a pre-stressed compression spring (14), in which connection the parts which are movable relative to each other may carry out either a rotating or a linear movement.

Compact and easily and simply mounted structural units are obtained by integrating the compensating element (8, 8') in the set-point adjuster (1) or control element (4).

BRIEF DESCRIPTION OF THE DRAWINGS

With the above and other objects and advantages in view, the present invention will become more clearly understood in connection with the detailed description of preferred embodiments, when considered with the accompanying drawings, of which

DETAILED DESCRIPTION OF THE PREFERRED EMBODIMENTS

Figure 1:
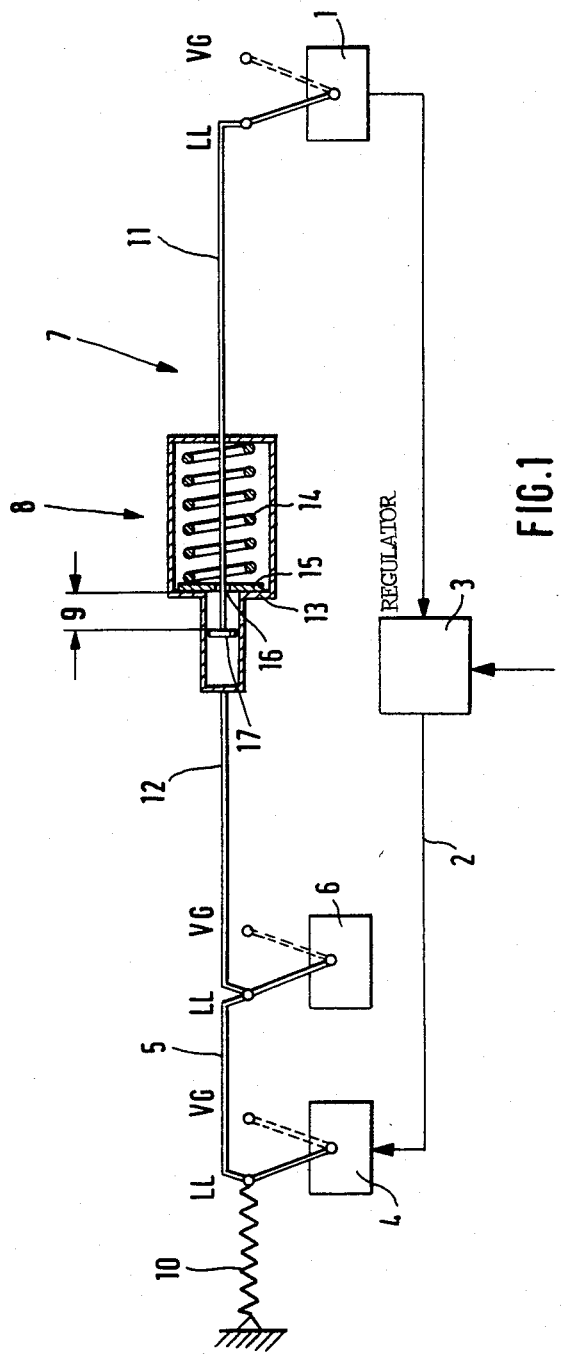
FIG. 1 is a block diagram of a first embodiment of a device according to the invention.

The devices shown in the figures have a set-point adjuster 1 which is displaceable by the driver by means of a gas pedal (not shown) between an idling position LL and a full-gas position VG. Electrical transmission means 2 lead from the set-point adjuster 1, via an electronic regulator 3, to a control element 4. The electrical signal of the set point adjuster 1 is further influenced within the regulator 3 by, for instance, the signal of a speed limiter and fed to the control element 4.

The control element 4 is so connected via a coupling piece 5, to a control member 6, such as a throttle valve in the intake line of an internal combustion engine, that control element 4 and control member 6 are always in a position corresponding to each other between an idling position LL and a full-gas position VG. If the device is intact, a displacement of the control member 6 takes place corresponding to the position of the set-point adjuster 1 via the electrical transmission means 2.

Between the set-point adjuster 1 and the control element 4 or the control member 6 there is arranged a mechanical transmission element 7 or 7' having a compensating element 8 or 8' respectively by which, after overcoming the play 9, the control element 4 and the control member 6 can be actuated mechanically by the set point adjuster 1 and gas pedal.

Figure 2:
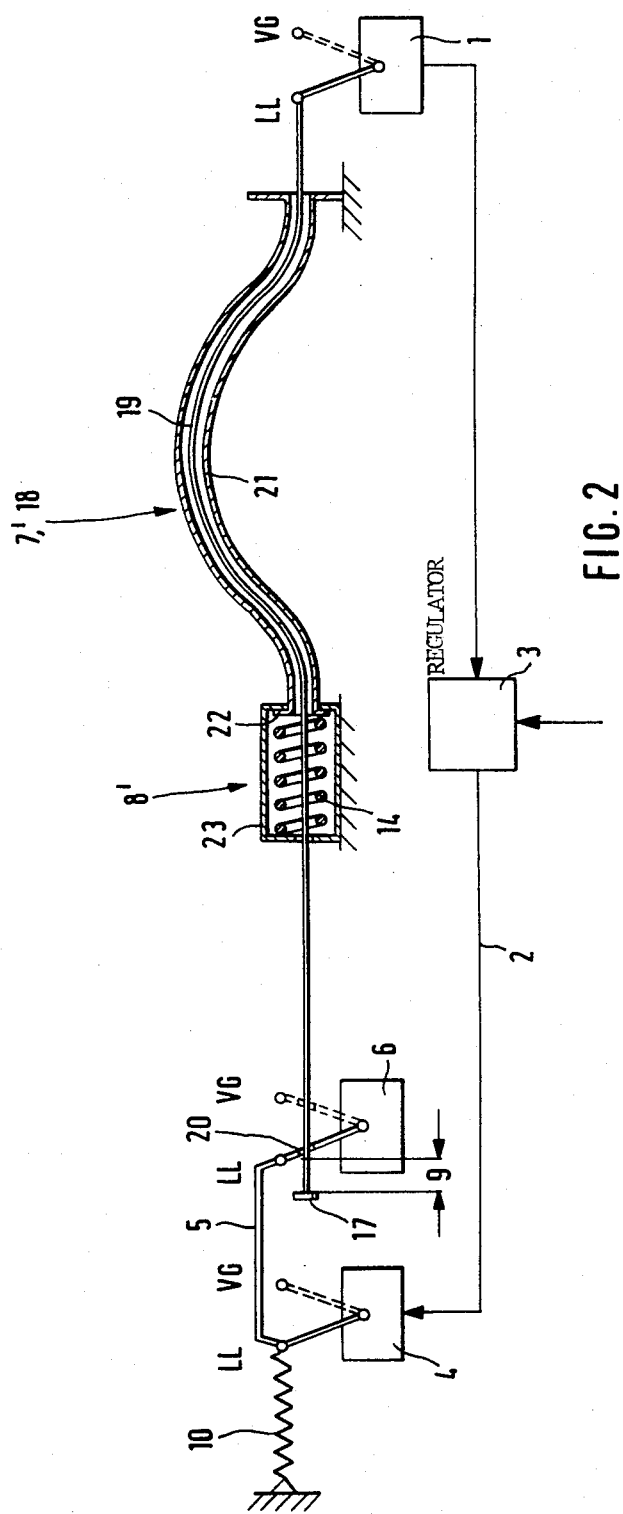
FIG. 2 is a second embodiment of a device.
Figure 3:
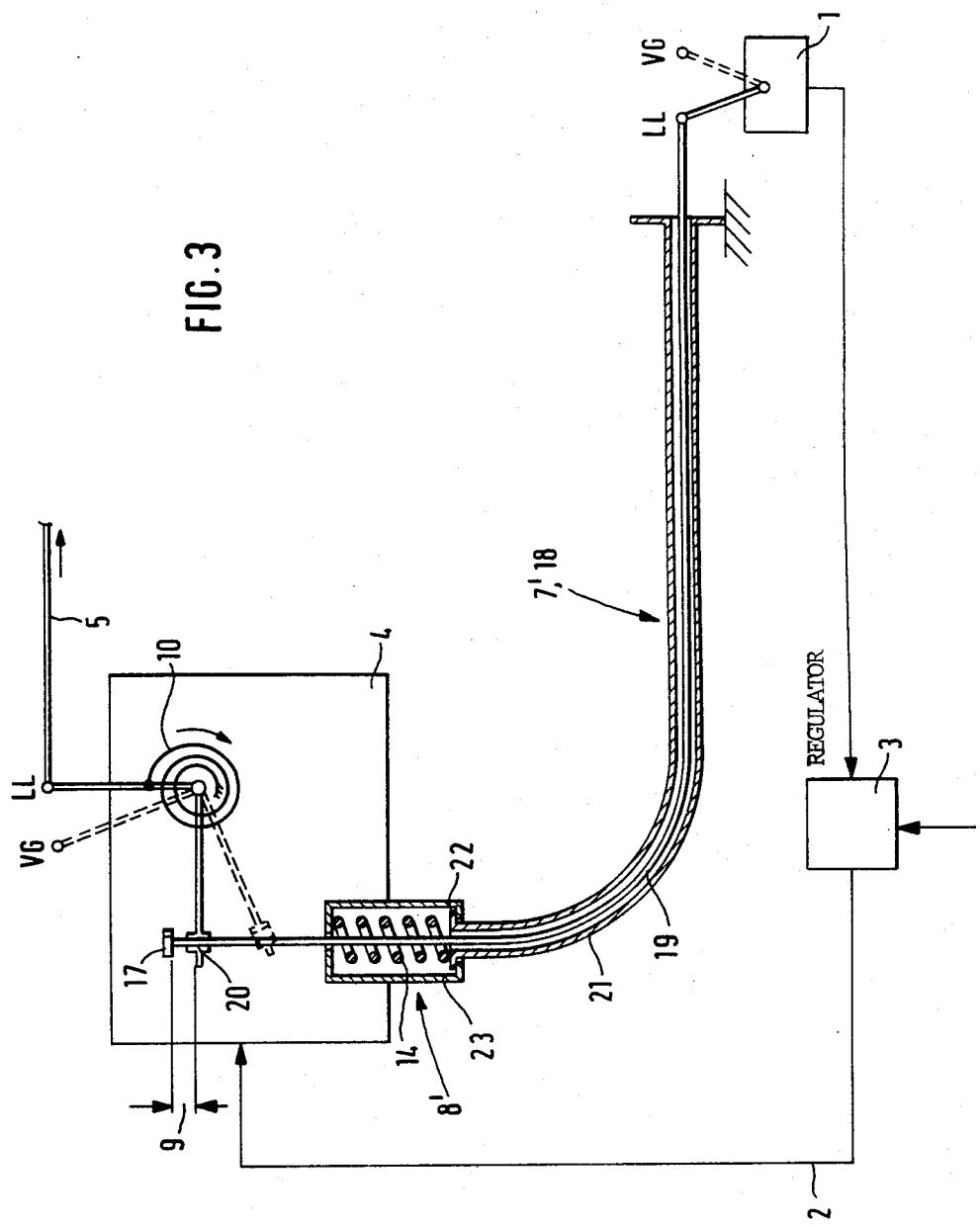
FIG. 3 is a third embodiment of a device.

By means of return spring 10, which is a linear draw spring in FIGS. 1 and 2 and a coil spring in FIG. 3 the control element 4 and the control member 6 are urged under spring force into their idling position.

In FIG. 1, the transmission element 7 consists of a bipartite rod one part 11 of which is connected to the set-point adjuster 1 while its second part 12 is connected to the coupling piece 5. The two parts 12 and 11, which are arranged movable coaxially to each other, are connected together by the compensating element 8.

The small step of a cup-shaped stepped bushing 13 is fastened coaxially to the part 12. Between the two ends of the large step a compression spring 14 is arranged under initial tension, its one end resting directly against the end wall nearer the set-point adjuster 1 while its other end rests via an axially displaceable stop disk 15 against the end further from the set-point adjuster 1.

The part 11 of the rod extends through the large step of the stepped bushing 13 and a central hole 16 in the stop disk 15 into the small step of the stepped bushing 13 and bears a stop 17 at this end.

In the disturbance-free device shown, the distance between the stop 17 and the stop disk 15 corresponds to the play 9. This play 9 is normally retained upon displacement of the set-point adjuster 1 by the simultaneous corresponding displacement of the control member 6. Only if, due to a special function, the regulator 3 controls the control element 4 for a smaller displacement from the idling position than the displacement of the set-point adjuster 1 is the play 9 reduced. Since such a difference, however, is less than 30% of the maximum displacement path of the set-point adjuster 1 and the play 9 amounts to 30% of this maximum displacement path, the stop 17 does not come against the stop disk 15.

In the event of a failure of the electric control of the control element 4, the latter as well as the control member 6, are moved by the return spring 10 in the direction of the idling position LL.

Upon movement of the set-point adjuster 1 in the full-gas direction, the part 11, after overcoming the play 9, comes with its stop 17 against the stop disk 15. Since the spring force of the compression spring 14 is greater than that of the return spring 10, displacement of the control element 4 and of the control member 6 also takes place upon further movement of the set-point adjuster 1 in the full-gas direction so that, with a path of displacement of 70% of the maximum displacement path, maneuverable driving can still be effected.

If the control of the control element 1 is still intact due to the special function via the regulator 3, then, with compression of the compression spring 14 the control element 4 and the control member 6 can move in the idling direction opposite the movement of the set-point adjuster in the full-gas direction.

In FIGS. 2 and 3, transmission element 7' and compensating element 8' are of identical development. The transmission element 7 consists of a Bowden cable 18 whose core 19 is fastened at one end to the set-point adjuster 1. The other end of the core 19 is provided with a stop 17 and is so arranged on the control element 6 or the control member 4 that it extends through a cutout 20 on the control element 6 or the control member 4 by the amount of the play 9, which amounts to 30% of the maximum displacement path of the control element 6 or control member 4.

The core 19 is guided displaceably in a flexible sleeve 21 of constant length, one end of which is arranged fixed in position in the region of the set-point adjuster 1. The other end of the sleeve 21 is provided with a radially widening flange 22 and extends into a bushing 23 arranged fixed in position, through which the core 19 is axially passed.

Within this bushing 23 a prestressed compression spring 14 of greater force than the force of the return spring 10, and rests against the end of the bushing 23 facing away from the set-point adjuster 1 and presses the flange 22 against the other end of the bushing 23.

The function of the devices shown in FIGS. 2 and 3 is, upon intact actuation by the electric transmission means 2, identical to the function of the device shown in FIG. 1.

In the event of a defect, after the play 9 has been overcome, the stop 17 comes at the cutout 20 against the control element 4 or the control member 6 and can displace the latter further by a displacement path of 70% of the maximum displacement path, against the force of the return spring 10, in the full-gas direction.

If, in the event of a mechanical coupling of set-point adjuster 1 and control element 4 or control member 6 via the stop 17, the control element 4 is contained in the idling direction by the regulator 3 as a result of a special function (indicated in the drawing by the vertical arrow to the regulator 3), then the core which is guided taut within the sleeve 21 pulls said sleeve, with a bending thereof, into the bushing 23 against the force of the compression spring 14.

We claim:

1. In a device for the transmission by electrical transmission means of the set point between an idling position and a full-gas position of an electrical set-point adjuster which is displaceable by the driver of a vehicle by means of a regulating unit, which adjuster controls the speed of travel of the vehicle by a control element which is displaceable in corresponding manner between an idling position and a full-gas position, and which adjuster is coupled with a control member which controls the fuel-air mixture of an internal combustion engine, the improvement comprising a mechanical transmission element disposed between said set-point adjuster and either of said control element and said control member, said mechanical transmission element being couplable to the set-point adjuster for transmission of the position of said set-point adjuster to the control member, and means responsive to the difference in position of said control member and the position of said set-point adjuster for disconnecting said transmission element from said set-point adjuster and/or said control element and/or said control member.

2. The device according to claim 1, wherein said transmission element is a rod.

3. The device according to claim 1, wherein said transmission element is a Bowden cable.

4. The device according to claim 1, further comprising spring means for resiliently biasing said control element and/or said control member into an idling position.

5. The device according to claim 1, wherein said disconnecting means includes a stop connected to said transmission element whereby, after the overcoming of the play, said disconnecting means can be coupled in a locked manner with a displacement member of either said set-point adjuster and/or said control element and/or said control member.

6. In a device for the transmission by electrical transmission means of the set point between an idling position and a full-gas position of an electrical set-point adjuster which is displaceable by the driver of a vehicle by means of a regulating unit, which adjuster controls the speed of travel of the vehicle by a control element which is displaceable in corresponding manner between an idling position and a full-gas position, and which adjuster is coupled with a control member which controls the fuel-air mixture of an internal combustion engine, the improvement comprising a mechanical transmission element disposed between said set-point adjuster and either of said control element and said control member, said mechanical transmission element being coupled to the set-point adjuster for transmission of the position of said set-point adjuster to the control member, and said transmission element is disposed movable with play freely in a direction of displacement of said set-point adjuster and/or said control element and/or said control member, said play being less than a maximum displacement path.

7. The device according to claim 6, wherein the play amounts to 30% of the maximum displacement path of said set-point adjuster and/or said control element and/or said control member.

8. In a device for the transmission by electrical transmission means of the set point between an idling position and a full-gas position of an electrical set-point adjuster which is displaceable by the driver of a vehicle by means of a regulating unit, which adjuster controls the speed of travel of the vehicle by a control element which is displaceable in corresponding manner between an idling position and a full-gas position, and which adjuster is coupled with a control member which controls the fuel-air mixture of an internal combustion engine, the improvement comprising a mechanical transmission element disposed between said set-point adjuster and either of said control element and said control member, said mechanical transmission element being coupled to the set-point adjuster for transmission of the position of said set-point adjuster to the control member, and said transmission element comprises a spring-loaded compensating element via which the part of said transmission element which can be connected with said set-point adjuster can be moved simultaneously against spring force towards the full-gas position, and the part of said transmission element which can be connected with said control element or said control member can be moved towards the idling position.

9. The device according to claim 8, wherein said compensating element has a pre-stressed compression spring for producing a spring force which acts on said transmission element.

* * * * *